United States Patent [19]

Hoffman, III

[11] 4,196,976

[45] Apr. 8, 1980

[54] LIQUID CRYSTAL DISPLAY DEVICE

[76] Inventor: William A. Hoffman, III, 555 Park Ave., Patterson, N.J. 07504

[21] Appl. No.: 873,337

[22] Filed: Jan. 30, 1978

[51] Int. Cl.² .............................................. G02F 1/13
[52] U.S. Cl. .................................... 350/351; 40/441; 40/448
[58] Field of Search .................. 350/351, 330; 40/441, 40/448

[56] References Cited

U.S. PATENT DOCUMENTS

| 3,732,119 | 5/1973 | Churchill et al. | 350/351 X |
| 3,802,945 | 4/1974 | James | 350/351 X |
| 3,852,092 | 12/1974 | Patterson et al. | 350/351 X |
| 3,908,052 | 9/1975 | Sanders | 350/351 X |

*Primary Examiner*—Edward S. Bauer

*Attorney, Agent, or Firm*—James J. Cannon, Jr.; James J. Cannon

[57] ABSTRACT

A multi-colored illuminated display device whereby colors are constantly changing due to small variations of temperature in the air moving about a contoured sheet of encapsulated cholesteric phase liquid crystal-coated polymeric film situated in a clear, colorless chimney. The rear interior surface of the chimney is coated to prevent the transmission of light therethrough, thus enhancing the reflected colors on the viewing faces. A source of heat and light such as a light bulb is used at the base. The heat rises by convection assisted by louvres or a small low speed fan may be installed. Many colorful designs may be achieved by varying the shape of the liquid crystal sheet and the range of heat temperatures used.

5 Claims, 3 Drawing Figures

LIQUID CRYSTAL DISPLAY DEVICE

BACKGROUND OF THE INVENTION

1. Field of the Invention

This invention pertains to decorative illuminated display devices, and in particular to those which use the combination of light and heat to achieve the desired effect. The result is a novel structure providing an illuminated display in varying colors.

2. Description of the Prior Art

The prior art discloses many illuminating devices to produce lighting effects of varying colors. Most of these use bulbs of various colors or clear bulbs with colored filters. Often, motion of the colored bulb or filter is used to vary the desired effect. There are also many prior patents on chemical substances which change color when introduced into a different chemical environment. There are also patents on devices in which an audio or electrical signal causes a change of color. The use of liquid crystals in temperature sensitive thermometers is well known.

However, the inventor knows of no illuminated display device which uses heat as a means of varying the colors in the display. In particular, no prior device has used the combination of moving heat and patterned liquid crystal sheets to produce a display device of constantly varying colors in unpredictable patterns.

SUMMARY OF THE INVENTION

The present invention is a decorative illuminated display device in which convected heat passes a contoured sheet of encapsulated cholesteric phase liquid crystal-coated polymeric film in a clear chimney having an opaque interior coated rear surface to produce the effect of constantly varying colors which change in unpredictable patterns. By varying the flow of heat, the placement and contour of the liquid crystal coated polymeric film sheet and the design of the housing, many various decorative effects can be achieved.

The display device of this invention includes a base housing containing a heat source and a separable upper housing which serves both as a chimney and a housing for the displayed liquid crystal colors. The base housing has a plurality of louvres or circular openings to permit the entry of air and the circulation of heat within the base housing. A separable chimney is placed above the base housing with an opening on the top of the base housing to permit the upward flow of heated air through the chimney. Since the chimney is separable from the base housing it may be positioned over a portion or all of said opening on the top of the base housing. The chimney is preferably formed from a clear, colorless plastic material. The base housing is preferably formed from an opaque material so that light is not lost through it. The interior surface of the rear wall of the chimney housing is coated with a black substance to prevent the transmission of light therethrough which would obscure the reflected colors on the viewing faces of the chimney. As mentioned previously, the chimney also serves as the upper housing to enclose a contoured sheet of cholesteric phase liquid crystal-coated polymeric film which may be viewed through three sides of the chimney housing. The precise contours of the liquid crystal sheet may be varied to achieve different effects. The partially opened chimney permits heated air to rise through the chimney and permits the light source to illuminate the viewing faces of the device. The colors in the liquid crystal polymeric film sheet vary in hue when air of varying temperatures passes up the chimney either by passing under the chimney or through the louvres in the base housing. The combination of moving air of varying temperatures and the contour of the liquid crystal polymeric film will produce a display device of varying colors and unpredictable patterns.

Many variations of the basic embodiment are possible. A plurality of small lights positioned about the perimeter edges of the base housing could be utilized in place of a single light bulb. A very slow speed fan with a moderate heat rise could be used to move air of varying temperatures past the liquid crystal sheet. The utilization of such a fan would permit greater flexibility in the placement of the lights which illuminate this display.

DESCRIPTION OF THE PREFERRED EMBODIMENT

Figure 1:
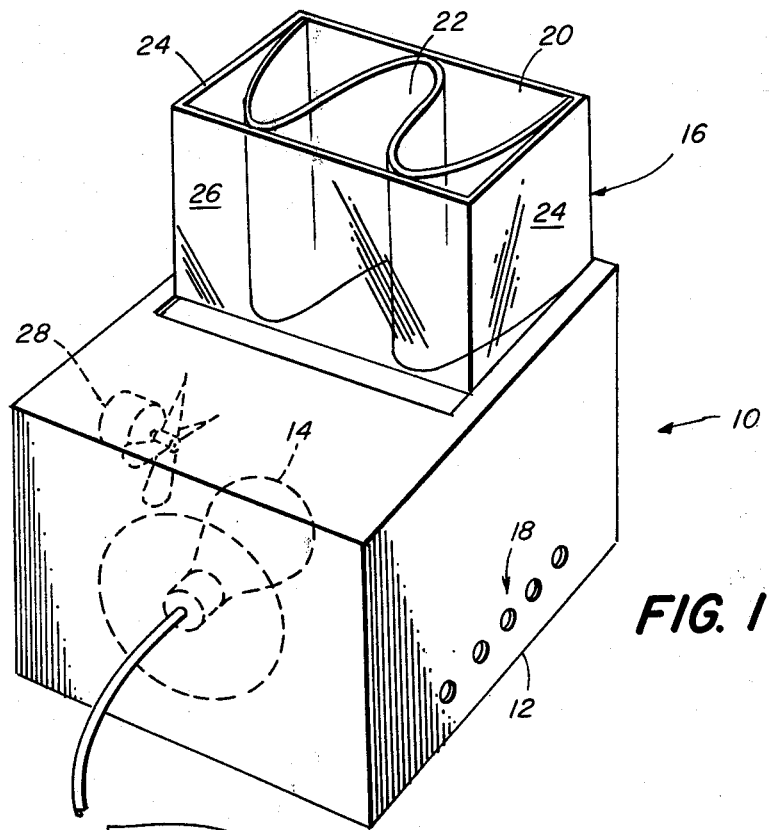
FIG. 1 is a front perspective view of the decorative illuminated display device of the present invention.

Referring now to the drawing, the decorative illuminated display device of the present invention is designated generally by the reference numeral 10. Display device 10 is shown having a substantially rectangular base housing 12, though the precise shape of the base housing may be varied. Base housing 12 may be made of any suitable opaque material. Mounted within base housing 12 and toward the front thereof is an electric light bulb 14 which serves as both a source of heat and light for display device 10. Other sources of heat and light may be used to achieve the same effect. A separable chimney 16 is shown to the rear top of base housing 12, which chimney 16 is illustrated as a rectangular, box-like structure and which serves to deflect both heat and light upward through an opening 20 in the top of base housing 12. Since chimney 16 is separable, and therefore movable, it may be positioned over a portion or all of the opening 20 in the top of base housing 12. Louvres 18 along the side walls of base housing 12 permit the inward flow of air to assist in the upward convection of heat. Chimney 16 also serves to hold a contoured sheet of encapsulated cholesteric phase liquid crystal-coated polymeric film 22. In the preferred embodiment sheet 22 is shown in a sine wave contour, but many other contours are possible. Preferably, the vertical side and front walls 24, 26 of chimney 16 are formed from a clear, colorless plastic material to permit the lighted polymeric film sheet 22 to be viewed. The interior rear wall 20 of chimney 16 is coated with a black substance to prevent the transmission of light therethrough which would obscure the reflected colors on the viewing faces 24, 26 of chimney 16. Usually the encapsulated cholesteric phase liquid crystal-coated polymeric film 22 is a polyester material.

In operation, when light 14 is turned on, it causes air within the base housing 12 to rise through opening 20 in base housing into chimney 16 and light 14 further illuminates the viewing faces 24, 26 of chimney 16. The heated air causes the encapsulated liquid cholesteric phase liquid crystal-coated polymeric film 22 to pass through various color phases which are visible because of the light reflected from its face. The colors of sheet 22 vary in hue when air of varying temperature passes up the chimney 16 either by passing under the chimney 16 or through lourvres 18 in the sides of base housing 12. The combination of moving air of varying temperatures through chimney 16, the illumination from light 14 and the contour of liquid crystal-coated polymeric film sheet 22 produces an attractive display device of varying colors and unpredictable patterns.

FIG. 1 also shows an optional very low speed fan 28 which may be utilized to move heated air past the liquid crystal sheet 22. A slow fan with a moderate heat rise can function as an air warmer, and thus allow the viewing lights 14 to be positioned other than under the chimney 16. An alternative light position is illustrated in FIG. 2 in which a plurality of small lights 30 are positioned around the perimeter of chinmey 16.

Some control of the heat flow, and thus the color pattern is provided by having a movable chimney 16. This also provides a means for blocking part of the air flow at either base end of chimney 16. These factors provide the user with a means to personalize the range of color patterns.

Figure 2:
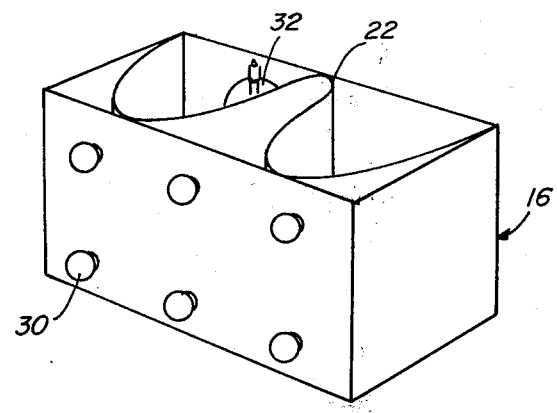
FIG. 2 illustrates an alternate embodiment in which a plurality of lights are positioned in the chimney.

FIG. 2 shows an alternate lighting means whereby a plurality of small lights are positioned in chimney 16.

Figure 3:
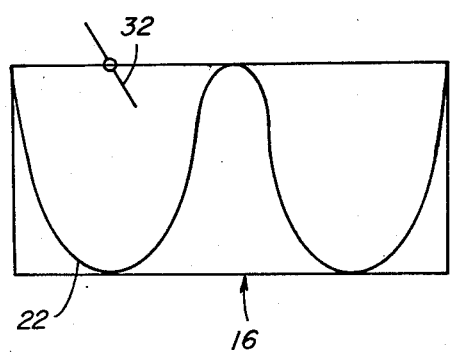
FIG. 3 is a top view of an alternate embodiment in which a damper is schematically illustrated in the rear wall of the chimney.

FIG. 3 shows schematically a top view of another embodiment in which a damper 32 is positioned in the back wall 20 of chimney 16. This affords further control of heat flow past liquid crystal sheet 22.

While I have described and illustrated herein one preferred embodiment of my invention, variations in design will be obvious to those skilled in the art. The invention is therefore defined specifically by the following claims:

I claim:

1. An illuminated display device comprising:
    a base housing of an opaque material;
    a source of light within said device;
    a source of heat within said base housing;
    a chimney separably positioned above said base housing; said chimney having front and side viewing surfaces of a clear material and an interior rear surface coated with a black opaque substance;
    an opening between said base housing and said chimney to permit the passage of heat and light therethrough;
    a sheet of encapsulated cholesteric phase liquid crystal-coated polymeric film positioned within said chimney in a contoured shape; such that when said heat and light sources are activated, the passage of heat and light through said chimney results in an illuminated display device of varying colors and unpredictable patterns.

2. The device of claim 1 wherein said sheet of encapsulated phase liquid crystal-coated polymeric film is a polyester film.

3. The device of claim 1 further including a low speed fan to assist in the flow of heat and also provide an additional source of heat.

4. The device of claim 1 wherein said source of light is a plurality of small lights positioned within said chimney.

5. The device of claim 1 wherein said sources of heat and light are a light bulb in said base housing.

* * * * *